(12) United States Patent  
Sato

(10) Patent No.: US 11,463,622 B2  
(45) Date of Patent: Oct. 4, 2022

(54) IMAGE CAPTURING DEVICE INCLUDING SUPERIMPOSED DISPLAY MODE AND CAMERA SHAKE CORRECTION MODE

(71) Applicant: Ricoh Company, Ltd., Tokyo (JP)

(72) Inventor: Koichi Sato, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 127 days.

(21) Appl. No.: 16/906,833

(22) Filed: Jun. 19, 2020

(65) Prior Publication Data

US 2021/0400197 A1 Dec. 23, 2021  
US 2022/0201212 A9 Jun. 23, 2022

(30) Foreign Application Priority Data

Jul. 5, 2019 (JP) .............................. JP2019-126407

(51) Int. Cl.  
H04N 5/232 (2006.01)

(52) U.S. Cl.  
CPC ....... *H04N 5/23267* (2013.01); *H04N 5/2328* (2013.01); *H04N 5/23218* (2018.08); *H04N 5/232939* (2018.08)

(58) Field of Classification Search  
None  
See application file for complete search history.

(56) References Cited

U.S. PATENT DOCUMENTS

| | | | | |
|---|---|---|---|---|
| 5,712,474 | A * | 1/1998 | Naneda | H04N 5/23248 250/208.1 |
| 7,706,678 | B2 * | 4/2010 | Ikeda | H04N 5/23293 396/296 |
| 9,413,970 | B2 * | 8/2016 | Fujita | H04N 5/232 |
| 2014/0002709 | A1 * | 1/2014 | Sakurabu | G03B 13/06 348/333.09 |
| 2014/0267803 | A1 * | 9/2014 | Shintani | H04N 5/23218 348/208.2 |
| 2015/0109467 | A1 * | 4/2015 | Fujita | H04N 5/23264 348/208.4 |
| 2017/0195553 | A1 * | 7/2017 | Shiozaki | H04N 5/23245 |
| 2018/0115722 | A1 | 4/2018 | Okamoto | |
| 2018/0198985 | A1 * | 7/2018 | Ishitsuka | H04N 5/232935 |
| 2018/0270423 | A1 * | 9/2018 | Takahashi | H04N 5/2327 |
| 2019/0088706 | A1 | 3/2019 | Sato | |
| 2020/0259983 | A1 * | 8/2020 | Aoki | H04N 5/23254 |
| 2020/0259985 | A1 * | 8/2020 | Takahashi | H04N 5/232939 |
| 2020/0404135 | A1 * | 12/2020 | Sato | H04N 5/23245 |

FOREIGN PATENT DOCUMENTS

JP 2017-38246 A 2/2017  
JP 2018-67883 A 4/2018

* cited by examiner

*Primary Examiner* — Cynthia Segura  
(74) *Attorney, Agent, or Firm* — Xsensus LLP

(57) ABSTRACT

An image capturing method for an image capturing apparatus includes setting a shake correction mode that performs shake correction processing during shooting, and a superimposed display mode that performs superimposition and display of an optical viewfinder display and an electronic viewfinder display. When the shake correction mode and the superimposed display mode are set, a captured image for which the shake correction processing is not performed, or an image equivalent to the state without shake correction processing, is used as the electronic viewfinder display.

11 Claims, 15 Drawing Sheets

IMAGE CAPTURING DEVICE INCLUDING SUPERIMPOSED DISPLAY MODE AND CAMERA SHAKE CORRECTION MODE

BACKGROUND

Technical Field

Embodiments of the present disclosure relate to an image processing system and an image processing method.

Background Art

Image capturing devices, such as digital cameras, typically include an optical viewfinder (OVF) and an image display, such as a liquid crystal panel. A user can observe both an optical image through the optical view finder and the electronic captured image through an electronic view finder (EVF).

SUMMARY

The present disclosure provides an image capturing device and an image capturing method configured to perform display of a suitable view finder image (smooth and with no delay) even during continuous shooting.

Exemplary aspects of the disclosure include an imaging device that has circuitry to set a shake correction mode that performs shake correction processing during shooting, and a superimposed display mode that performs superimposition and display of an optical viewfinder display and an electronic viewfinder display. When shake correction mode and the superimposed display mode are set, a captured image for which the shake correction processing is not performed, or an image equivalent to the state without shake correction processing, is used as the electronic viewfinder display.

BRIEF DESCRIPTION OF THE DRAWINGS

The aforementioned and other aspects, features, and advantages of present disclosure will be better understood by reference to the following detailed description when considered in connection with the accompanying drawings, wherein.

Figure 1:
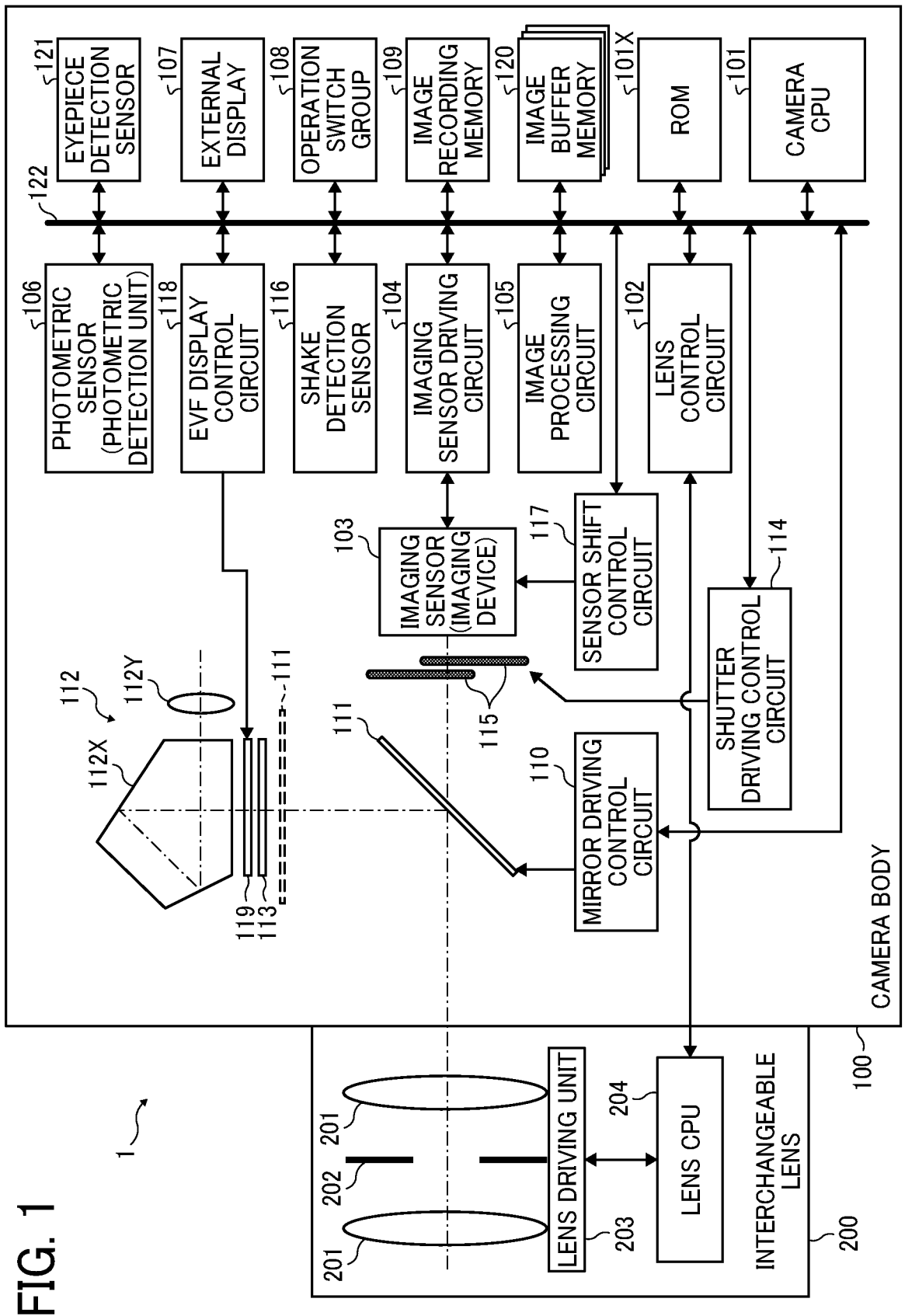
FIG. 1 is a block diagram of configuration of an image capturing device according to an exemplary embodiment of the present disclosure.

As can be appreciated, the accompanying drawings are provided to facilitate a more detailed understanding of the inventive concepts of the present disclosure. However, these drawings are in no way limiting upon the scope thereof. Also, the accompanying drawings are not to be considered as drawn to scale unless explicitly noted.

DETAILED DESCRIPTION

The terminology used herein is for the purpose of describing the exemplary embodiments of the disclosure and is not intended to be limiting thereon. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing the example embodiments shown in the drawings, specific terminology is employed for the sake of clarity. However, the present disclosure is not intended to be limited to the specific terminology used, and it is to be understood that each specific element includes all technical equivalents that have substantially the same structure, operate in substantially the same manner, and achieve substantially the same result.

Exemplary embodiments of the present disclosure are described below. However, these exemplary embodiments are illustrative, not limiting, and various applications and modifications may be made without departing from the scope of the invention.

FIG. 1 is a block diagram of an overall configuration of the digital camera 1 according to the first exemplary embodiment of the present disclosure The digital camera 1 is an imaging apparatus that performs an imaging method. However, the imaging apparatus may also be other electronic and electric devices, such as a mobile phone, a tablet computer, a desktop computer, a laptop computer, a personal digital assistant, and the like. Thus, the exact device used as the imaging apparatus is not limiting upon the scope of the present disclosure.

The digital camera 1, for example a digital single-lens reflex camera, includes an optical view finder (OVF), an electronic view finder (EVF), and a hybrid finder that overlaps the OVF display and the EVF display. Further, the digital camera has a shake correction mode (optical (sensor-shift method), electronic) that can be performed a shake correction processing at the time of shooting as one of the shooting modes.

The digital camera 1 includes a camera body 100 having an imaging function and an interchangeable lens 200. The interchangeable lens 200 includes an imaging optical system and is detachably attached to the camera body 100.

The interchangeable lens 200 also includes a plurality of lens units 201 (two in the illustrated example), a stop 202 provided between the plurality of lens units 201 (between the two lens units 201 in the illustrated example), a lens driving 203, and a control circuit, such as a lens CPU 204.

Each lens unit 201 provides positive or negative power (convergence or divergence) to the subject light in order to form the subject light on the imaging sensor 103 described below. The stop 202 adjusts its opening diameter so as to adjust the amount of light during shooting. The stop 202 also functions as a shutter for adjusting an exposure time when shooting still images. The lens unit 201 and the stop 202 are movable in the optical axis direction and are moved in the optical axis direction by the lens driving unit 203 to perform zooming and focusing. The lens CPU 204 sends a command to the lens driving unit 203 to perform opening control of the stop 202 and zooming control and focusing control by the lens unit 201. The lens CPU 204 communicates with a camera CPU 101 (described below) via a lens side mount (not shown).

The camera body 100 includes the camera CPU 101 that controls the camera body 100. The camera CPU 101 includes circuitry such as an arithmetic unit, a read-only memory (ROM) 101X, a random-access memory (RAM), an A/D converter, a D/A converter, and communication interface circuit. In FIG. 1, the ROM 101X of the camera CPU 101 is described with the reference numeral ROM 101X. Based on a predetermined program stored in the ROM 101X of the camera CPU 101, various circuits of the camera body 100 are driven to perform actions/processes such as zooming processing, focus adjustment processing (AF processing), photographing processing, image processing, recording processing, and the like. Lens control such as zooming processing and focus adjustment processing is executed by communicating with the lens CPU 204 via the lens control circuit 102, a camera-side mount contact (not shown), and a lens-side mount (not shown).

The camera body 100 includes an imaging sensor (imaging device) 103 on which subject light incident from a photographing optical system (the lens units 201 and diaphragm 202) of the interchangeable lens 200 forms an image. The imaging sensor 103 is composed of, e.g., a CCD or a CMOS sensor, and associated circuitry. The imaging sensor 103 includes a two-dimensional single-plate color sensor. In this sensor, light receiving devices are arranged on M pixels in the horizontal direction and on N pixels in the vertical direction, and a primary color mosaic filter on a Bayer array is formed on-chip (M and N are integers).

The imaging sensor driving circuit 104 controls the imaging operation of the imaging sensor 103 and transmits the acquired image signal to the camera CPU 101. The image processing circuit 105 performs processing such as color interpolation, (gamma) conversion, and image compression of the image acquired by the imaging sensor 103. Further, the image processing circuit 105 processes various information items to be superimposed and displayed on the EVF. Further, the various information items can be superimposed not only on the EVF display, but also on the display of the external display 107. Here, the various information items can include information such as whiteout information, blackout information, focusing information, and contour information.

The imaging sensor 103 further includes a focus detection pixel on the imaging surface, and transmits the output of the focus detection pixel to the camera CPU 101. The camera CPU 101 calculates a defocus amount based on the acquired focus detection data and acquires information for driving the lens unit 201 for focusing.

A photometric sensor 106 is disposed, for example, in a finder optical system 112 described below, detects the brightness of the subject at the time of shooting, and transmits photometric data to the camera CPU 101. The camera CPU 101 calculates appropriate exposure conditions (exposure time, stop value, sensitivity, etc.) based on the acquired photometric data, and sets the operation of the digital camera 1. Although the configuration including a photometric sensor 106 is provided above, the output from the imaging sensor 103 can be used in place of the photometric sensor 106 by holding a shutter 115 (described below) in an open state.

The external display 107 is composed of, for example, an LCD, and displays a preview image at the time of shooting, a confirmation image after shooting, a reproduced image of the recorded image, information on the shooting mode of the camera, and other various information. An operation switch group 108 includes a power switch, a shooting switch, a shooting mode selection switch, and the like. An image recording memory 109 is, for example, a detachable memory, and records captured images including moving images and still images.

The mirror driving control circuit 110 controls mirror up/mirror down of a quick return half mirror (movable mirror) 111. The quick return half mirror 111 splits the light beam incident from the photographing optical system (including the lens unit 201 and stop 202) of the interchangeable lens 200 to the finder optical system 112 and the imaging sensor 103. Then, the light beam is formed on the focusing screen 113 and/or the imaging surface of the imaging sensor 103, respectively. The finder optical system 112 includes a pentaprism 112X and an eyepiece lens 112Y. The pentaprism 112X converts a subject image, which is primarily formed on the focusing screen 113 by reflecting by the quick return half mirror 111, into an erect image. The eyepiece 112Y is for a user to look at the erect image formed by the pentaprism 112X. The shutter driving control circuit 114 controls the exposure and light shielding to the imaging sensor 103 by controlling the opening and closing of the shutter 115 disposed immediately in front of the imaging sensor 103.

A shake detection sensor 116 detects a shake state of the digital camera 1, and transmits the shake data to the camera CPU 101. A sensor shift control circuit 117 controls the shift of the position of the imaging sensor 103 based on the shake data from the camera shake detection sensor 116, and then the sensor shift control circuit 117 performs shake correction control. As the shake detection sensor 116, for example, at least one of an angular acceleration sensor and an acceleration sensor can be used. The shake correction can also be performed by shifting the position of the lens 201 instead of/in addition to shifting the position of the imaging sensor 103.

An EVF display control circuit 118 is disposed in the finder optical system 112 and performs display control of an EVF display 119 for superimposing and displaying the EVF (electronic viewfinder) display on the OVF (optical viewfinder) display. The EVF display 119 is a transmissive display, and for example, a transmissive organic EL display can be used. Thus, a hybrid viewfinder that superimposes an OVF (optical viewfinder) display and an EVF (electronic viewfinder) display is configured.

An image buffer memory 120 is a memory that temporarily stores various image data (recorded image data, external display image data, EVF display images data, and the like). The image buffer memory 120 is preferably a FIFO (First-In First-Out) type memory. Image data, read out from the image sensor 103 and subjected to image processing, are sequentially stored in the image buffer memory 120. Then, by sequentially reading out the image data from the image buffer memory 120, the image is displayed on the external display 107 and/or the EVF display 119. Further, the image is recorded in the image recording memory 109 by performing an image compression process or the like. At this time, by shifting the reading area of image data based on the shake data of the shake detection sensor 116, the shake can be corrected electronically without mechanically shifting the imaging sensor 103.

An eyepiece detection sensor 121 is a sensor that detects whether the eyepiece lens 112Y in the finder optical system 112 is being looked into by a user or not. For example, a time proximity sensor, such a time-of-flight (ToF) sensor, can be used. However, other sensors can also be used as one of ordinary skill would recognize.

As can be appreciated components of the camera body 100 are connected to each other by a bus 122 so that various signals, data, and the like can be exchanged. The exact configuration of the bus, the protocols used to communicate data therethrough, and the signaling used therein is not limiting upon the present disclosure.

The configuration of the digital camera 1 described above is only an example, and various design changes can be made. For example, a hybrid finder is not limited to the configuration described above. A configuration can be adopted in which an EVF image is projected by arranging a half mirror in front of the eyepiece, as disclosed in Japanese Patent Publication No. 2017-038246. Alternatively, the components can achieve a hybrid finder using the structure described in the patent documents 1 and 2 mentioned above.

The quick return half mirror (movable mirror) 111 is moveable between a mirror-down position and a mirror-up position. The mirror-down position is that in which the quick return half mirror (movable mirror) 111 is inserted on the optical path to reflect the subject light to the finder optical system 112 and transmit the light to the image sensor (image sensor) 103. The mirror-up position is that in which the quick return half mirror (movable mirror) 111 is evacuated from the optical path to be able to pass through the subject light for the image sensor (image device) 103. In FIG. 1, the quick return half mirror (movable mirror) 111 in the mirror down position is drawn with a solid line, and the quick return half mirror (movable mirror) 111 in the mirror up position is drawn with a broken line.

The digital camera 1 according to the present embodiment includes a shake correction mode in which shake correction processing is performed at the time of shooting. The shake correction processing in the shake correction mode includes an optical shake correction processing and an electronic shake correction processing.

The optical shake correction processing is used when photographing while driving the imaging sensor 103 in a direction different from the optical axis (for example, a direction orthogonal to the optical axis). It is sensor-shift method, as described in more detail below. For this reason, the image formed on the imaging sensor 103 has already been removed from the influence of shaking.

The electronic shake correction processing performs image processing for shake correction on an image formed on the imaging sensor 103. For this reason, the image formed on the imaging sensor 103 includes the effects of shake. These effects are is removed after image processing for shake correction is performed.

The digital camera 1 according to the present exemplary embodiment includes a superimposed display mode in which an optical viewfinder display (an optical image by the finder optical system 112) and an electronic viewfinder display (an electronic image by the imaging sensor 103) are superimposed (overlapped) and displayed.

When optical shake correction (sensor shift method) and electronic shake correction are performed in a hybrid finder having both OVF function and EVF function (overlapping OVF display and EVF display), there may be a gap between OVF display and EVF display. As a result, the quality of the finder image can be deteriorated (decreased visibility). Specifically, a white-out area due to over-luminance, a black-out area due to under-luminance, and blurred outlines due to differences in brightness or color difference may appear in the finder image and have an adverse effect.

In the present exemplary embodiment, when the shake correction mode and the superimposed display mode are set in the digital camera 1, a captured image that has not performed the shake correction processing, or an equivalent image is used for electronic viewfinder display. That is, the quality of the captured image displayed on the external display 107 or recorded in the image recording memory 109 can be improved by using an image that has performed the shake correction processing. On the other hand, in the EVF display superimposed on the OVF display by the hybrid viewfinder, the quality of the viewfinder image can be improved by using an image that has not performed the shake correction processing. In the present embodiment, in order to obtain the latter merits, a captured image that has not performed the shake correction processing, or an equivalent image is used for EVF display (electronic viewfinder display) for superimposing OVF display (optical viewfinder display).

More specifically, in the case of optical shake correction processing (sensor-shift method), in the electronic viewfinder display, an image formed on the imaging sensor 103 performed reversely correction processing to an image before shake correction can be used as an image equivalent to a captured image which the shake correction processing has not performed. The reverse correction processing can be performed by, for example, the image processing circuit 105 in FIG. 1. As a result, even when the optical shake correction processing (sensor shift method) is performed on a captured image, a high-quality finder image can be obtained by suppressing the gap between the optical viewfinder display and the electronic viewfinder display. (The captured image is displayed on the external display 107 or recorded in the image recording memory 109).

On the other hand, in the case of electronic shake correction processing, in the electronic viewfinder display, an image formed on the imaging sensor 103 can be a captured image which shake correction processing has not performed. As a result, even when the electronic shake correction processing is performed on a captured image, it is possible to obtain a high-quality finder image while suppressing the gap between the optical viewfinder display and the electronic viewfinder display. (The captured image is displayed on the external display 107 or recorded in the image recording memory 109). In addition, the burden of signal processing by electronic shake correction processing is reduced, and power consumption can be reduced.

Figure 2A:
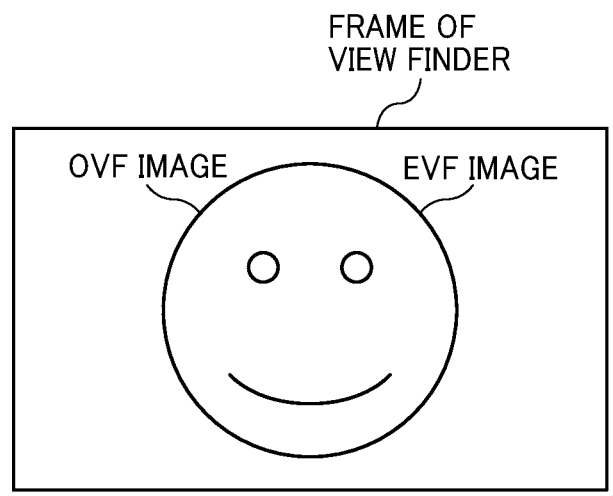
FIG. 2A is conceptual diagram showing the operational effects of an image capturing device according to the exemplary embodiment of the present disclosure.
Figure 2B:
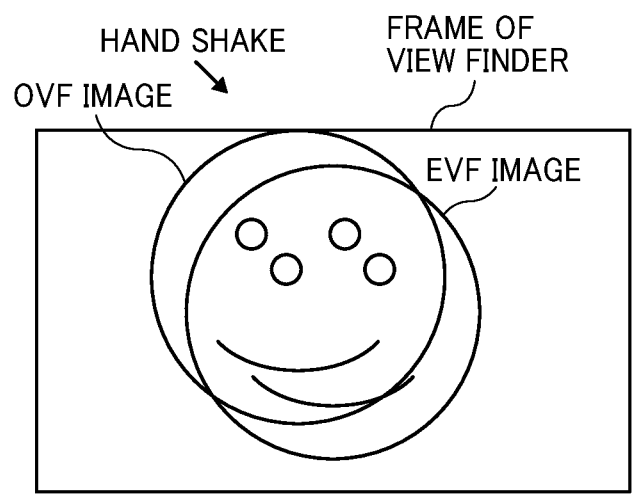
FIG. 2B is another conceptual diagram showing the operational effects of an image capturing device according to the exemplary embodiment of the present disclosure.
Figure 2C:
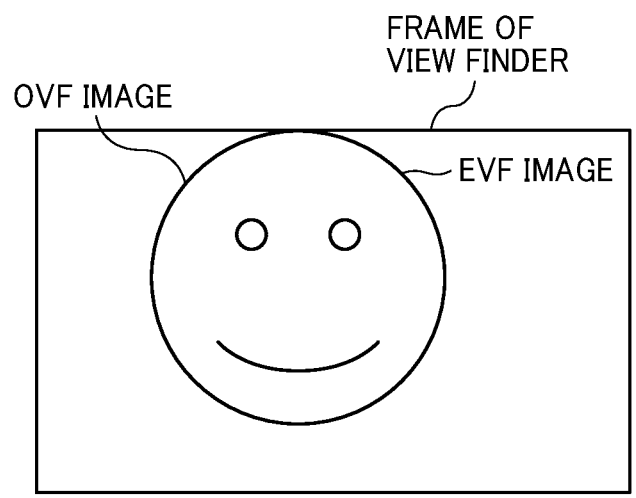
FIG. 2C is a further conceptual diagram showing the operational effects of an image capturing device according to the exemplary embodiment of the present disclosure.

FIG. 2A to 2C show conceptual diagrams showing the operational effects of the digital camera 1 according to the present exemplary embodiment. In FIG. 2A to 2C, the OVF image and EVF image in the finder frame are illustrated as simplified characters.

FIG. 2A shows a case when shake correction has not occurred, and the OVF image and the EVF image are correctly superimposed and displayed.

FIG. 2B shows a case when the viewfinder frame is shifted in the lower right direction in FIG. 2B due to camera shake from the state of FIG. 2A. And FIG. 2B shows an EVF image on which is performed shake correction processing. In this case, the OVF image relatively moves in the upper left direction due to shake, while the EVF image moves like the frame of the viewfinder in the lower right direction because the shake correction processing is performed. As a result, the overlapping position of the OVF image and the EVF image is shifted, and the quality of the finder image is deteriorated (decrease in visibility).

FIG. 2C shows a case when the viewfinder frame is shifted in the lower right direction in FIG. 2B due to camera shake from the state of FIG. 2A. And FIG. 2C shows it is used as an EVF image that a captured image when the shake correction processing of the present exemplary embodiment is not performed, or an equivalent image. In this case, the OVF image relatively moves in the upper left direction due to shake, and the EVF image, which is the captured image when the shake correction processing of the present exemplary embodiment is not performed, or an equivalent image, also relatively moves in the upper left direction. As a result, the OVF image and the EVF image are correctly superimposed and displayed without being influence by shake, and the quality of the finder image can be improved.

The electronic viewfinder display (EVF image) of the present exemplary embodiment may include various types of information obtained by performing various types of processing on the image formed on the imaging sensor 103. So since various information items can be confirmed by being superimposed on the electronic viewfinder display (EVF image), the quality of the viewfinder image can be improved.

Examples included as various types of information included in the electronic viewfinder display (EVF image) will be described below. For example, in the case of a normal visible light imaging sensor, a signal obtained by photographing is an RGB image signal, and luminance color differences (Y, Cb, Cr) are obtained by signal processing. Examples of image information (various information) obtained from the signals include display of over-brightness (out-of-brightness) areas, display of under-brightness (blackout) areas, display of brightness steps and color difference steps (outlines). The various information items are supplied in real time at the time of photographing. Furthermore, in the case of an imaging sensor provided with an image plane phase difference pixel, the display of the focus area (focused part peaking) can be used as various information. In addition, the AF point and menu display can be used as the various information items. On the other hand, when a special imaging sensor is provided, the prior information regarding the special imaging can be used as the various information items. For example, in the case of an imaging sensor including an infrared pixel, a pixel having a large amount of infrared can be used as the various information items, and in the case of an imaging sensor including a polarizer pixel, the polarization state of each pixel can be used as the various information items.

As described above, various types of information included in the electronic viewfinder display (EVF image) include at least one of the brightness over area of the image, the brightness under area of the image, the brightness step of the image, the color difference step of the image, the focus region of the image, the infrared region of the image, and the polarization region of the image.

In the present exemplary embodiment, as a record image and an external display image, an image performed shake correction processing different from the electronic viewfinder display (EVF image) is used. For this reason, it is possible to obtain a high-quality captured image from which the influence of shake is removed. The record image is an image recorded in the image recording memory 109, and the external display image is an image displayed on the external display device 107. The shake correction processing may be either optical (sensor-shift method) or electronic.

In the present exemplary embodiment, for example, when the eyepiece detection sensor 121 detects the user's eyepiece with respect to the finder optical system 112, the shake correction processing is not performed until the release button (for example, the operation switch group 108) is pressed. When the release button is pressed, shake correction processing can be performed. By eliminating the need for shake correction processing when the photographer is looking through the viewfinder but does not press the release button, the signal processing load is reduced compared to the case where shake correction processing is always performed, thereby reducing power consumption.

In the present exemplary embodiment, for example, when the eyepiece detection sensor 121 does not detects the user's eyepiece with respect to the finder optical system 112, for external display images displayed on the external display 107, shake correction processing can be performed before the release button is pressed. Thus, by performing the minimum necessary shake correction processing, it is possible to reduce the load of signal processing and reduce power consumption.

The quick return half mirror (movable mirror) 111 can be rotated between a mirror-down position and a mirror-up position. At the mirror-down position, the quick return half mirror (movable mirror) 111 is inserted on the imaging optical path, reflects the subject light to the finder optical system 112, and transmits it to the imaging sensor 103. At the Mirror-up position, the quick return half mirror (movable mirror) 111 is retracted from the imaging optical path and allowing subject light to pass through the imaging sensor 103. In the present embodiment, when the superimposed display mode of OVF display and EVF display is set, the quick return half mirror (movable mirror) 111 is prohibited from rotating to the mirror-up position and is maintained at the mirror-down position. As a result, it is possible to reliably obtain an EVF display in the superimposed display mode.

Figure 3:
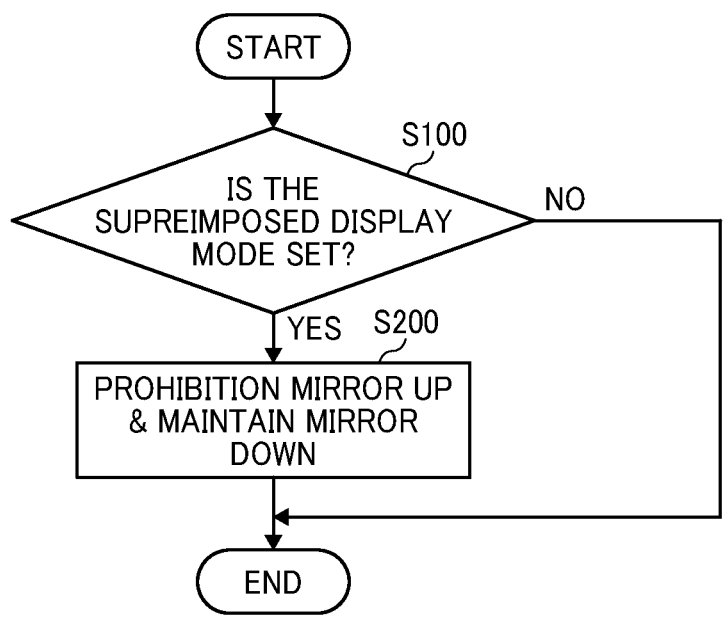
FIG. 3 is a flow chart showing drive control of the quick return half mirror according to the exemplary embodiment of the present disclosure.

FIG. 3 is a flowchart showing drive control of the quick return half mirror according to the present embodiment.

In step ST100, it is determined whether or not a superimposed display mode of OVF display and EVF display is set. When the superimposed display mode of OVF display and EVF display is set (YES in step ST100), the process proceeds to step ST200. When the superimposed display mode of OVF display and EVF display is not set (NO in step ST100), the process ends.

In step ST200, the quick return half mirror (movable mirror) 111 is prohibited from rotating to the mirror-up position and is maintained at the mirror-down position. As a result, it is possible to reliably obtain an EVF display in the superimposed display mode.

Figure 4:
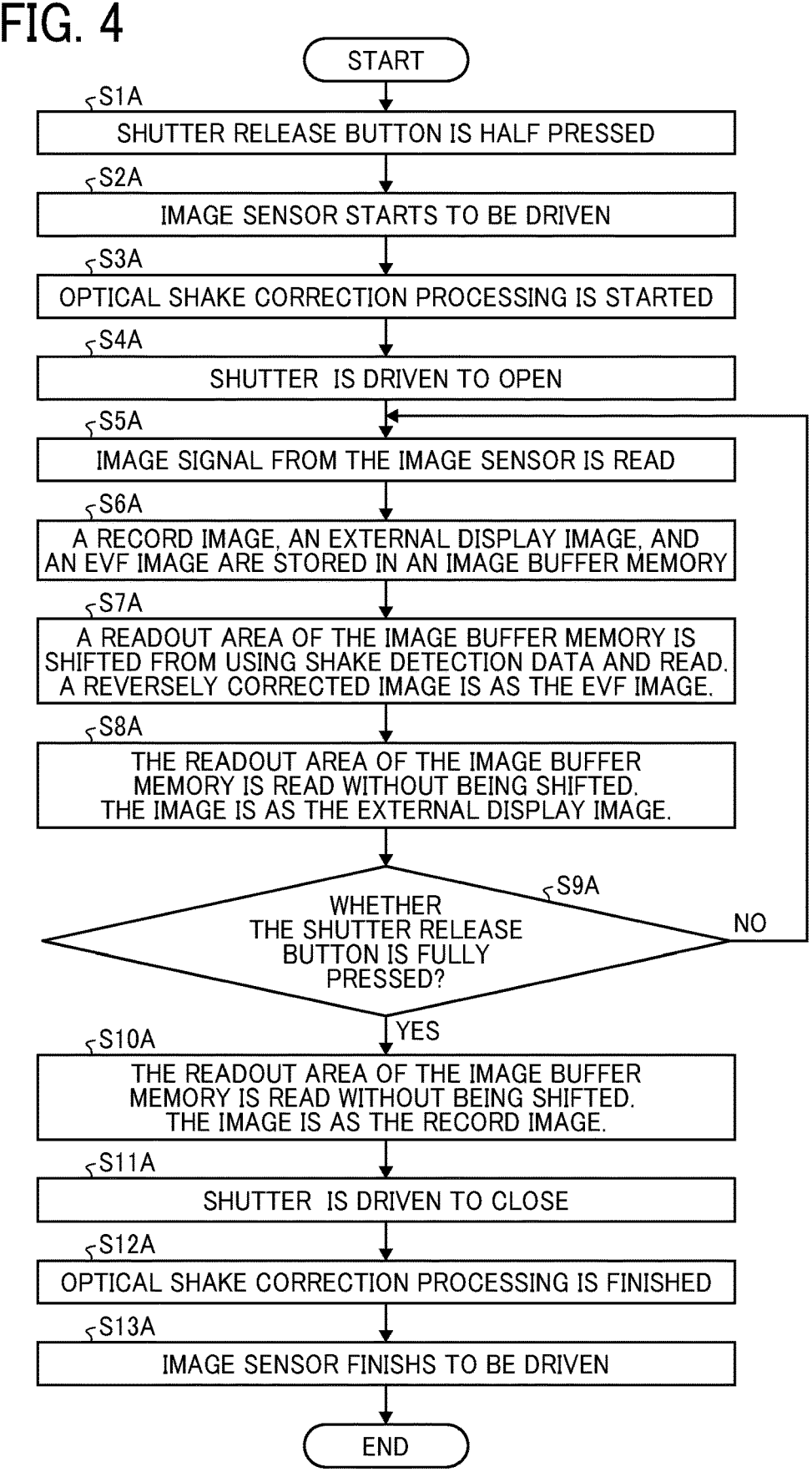
FIG. 4 is a flow chart of a first operation of an image capturing device according to the exemplary embodiment of the present disclosure.

FIG. 4 is a flowchart showing a first operation of the digital camera according to the present exemplary embodiment. The first operation corresponds to some conditions, which are optical shake correction processing (sensor-shift method), shake reverse correction (when reading memory), recording shake correction image and displaying the external display performs at the time when reading memory, and no eyepiece determination.

In step 1A, a shutter release button is half pressed. In step 2A, an imaging sensor 103 starts to be driven. In Step 3A, an optical shake correction processing (sensor-shift method) is started. In step 4A, a shutter 115 is driven to open. In step 5A, an image signal from the imaging sensor 103 is read. In step 6A, a record image, an external display image, and an EVF image are generated and stored in an image buffer memory 120.

In step 7A, a readout area of the image buffer memory 120 is shifted from using shake detection data and read, so that a reversely corrected image (an image equivalent to a captured image when the shake correction processing is not performed) is displayed as an EVF image. Thereby, a high-quality finder image in which the OVF display and the EVF display are correctly superimposed can be obtained.

In step 8A, an image, which is the readout area of the image buffer memory 120 that has been read without being shifted, is displayed on an external display 107 as an external display image. In step 9A, it is determined whether or not the shutter release button has been fully pressed. When the shutter release button has not been fully pressed (NO in step 9A), the process returns to step 5A. When the shutter release button has been fully pressed (YES in step 9A), the process proceeds to step 10A. In step 10A, the image, that the readout area of the image buffer memory 120 that has been read without being shifted, is as a record image. The record image is performed image compression processing or the like and recorded in an image recording memory 109. In step 11A, the shutter 115 is driven to close. In step 12A, the optical shake correction processing (sensor-shift method) is ended. In step 13A, the imaging sensor 103 is driven to finish.

Figure 5:
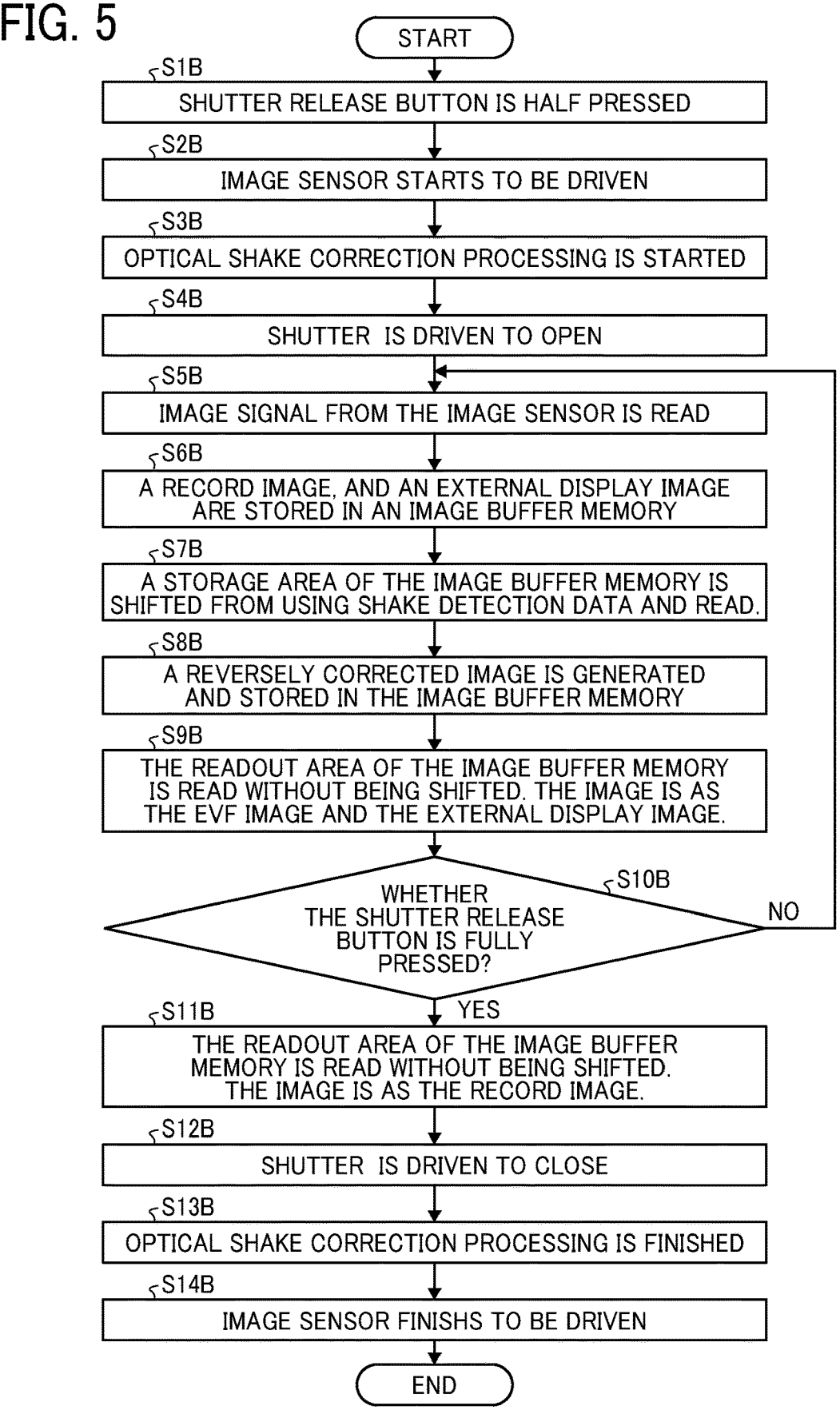
FIG. 5 is a flow chart of a second operation of an image capturing device according to the exemplary embodiment of the present disclosure.

FIG. 5 is a flowchart showing a second operation of the digital camera according to the present embodiment. The second operation corresponds to some conditions including optical shake correction processing (sensor-shift method), shake reverse correction (when storing memory), recording shake correction image and displaying the external display performs at the time when storing memory, and no eyepiece determination.

In step 1B, the shutter release button is half pressed. In step 2B, the imaging sensor 103 starts to be driven. In Step 3B, the optical shake correction processing (sensor-shift method) is started. In step 4B, the shutter 115 is driven to open. In step 5B, the image signal from the imaging sensor 103 is read. In step 6B, a record image, and an external display image are generated and stored in the image buffer memory 120.

In step 7B, a storage area of the image buffer memory 120 is shifted from using shake detection data. In step 8B, a reversely corrected image (an image equivalent to a captured image when the shake correction processing is not performed) is generated and stored in the image buffer memory 120 (the storage area of the image buffer memory is shifted in step 7B). In step 9B, the reverse corrected image is read without shifting the storage area of the image buffer memory 120. The reverse corrected image is as an EVF display and an external display image. Thereby, a high-quality finder image in which the OVF display and the EVF display are correctly superimposed can be obtained.

In step 10B, it is determined whether or not the shutter release button has been fully pressed. When the shutter release button has not been fully pressed (NO in step 10B), the process returns to step 5B. When the shutter release button has been fully pressed (YES in step 10B), the process proceeds to step 11B. In step 11B, the image, which is the readout area of the image buffer memory 120 that has been read without being shifted, is as a record image. The record image is performed image compression processing or the like and recorded in an image recording memory 109. In step 12B, the shutter 115 is driven to close. In step 13B, the optical shake correction processing (sensor-shift method) is ended. In step 14B, the imaging sensor 103 is driven to finish.

Figure 6:
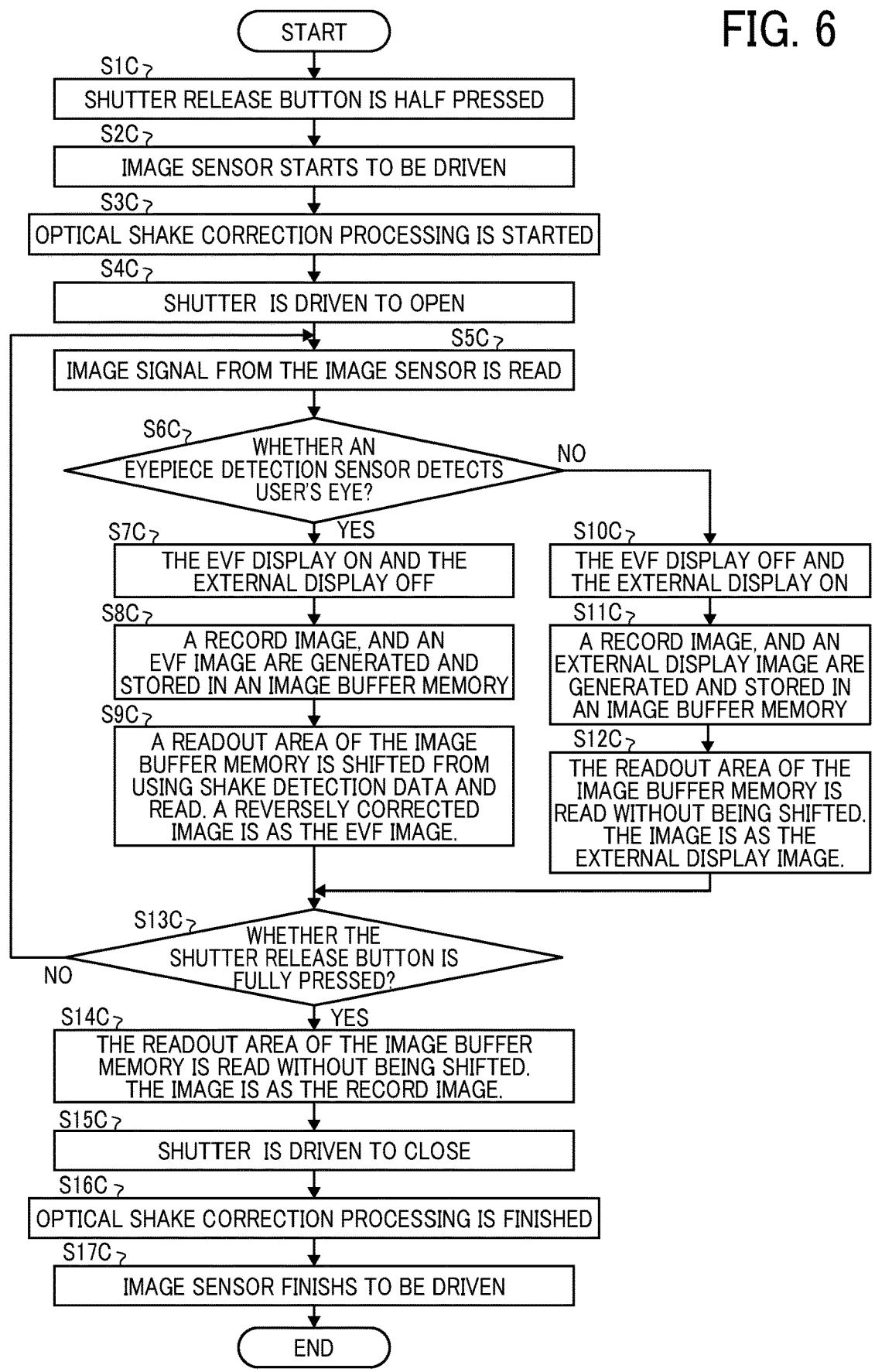
FIG. 6 is a flow chart of a third operation of an image capturing device according to the exemplary embodiment of the present disclosure.

FIG. 6 is a flowchart showing a third operation of the digital camera according to the present embodiment. The third operation corresponds to some conditions, which are optical shake correction processing (sensor-shift method), shake reverse correction (when reading memory), recording shake correction image and displaying the external display performs at the time when reading memory, and eyepiece determination.

In step 1C, the shutter release button is half pressed. In step 2C, the imaging sensor 103 starts to be driven. In Step 3C, the optical shake correction processing (sensor-shift method) is started. In step 4C, the shutter 115 is driven to open. In step 5C, the image signal from the imaging sensor 103 is read.

In step 6C, an eyepiece detection sensor 121 detects whether the finder optical system 112 is being looked into by a user or not. When the user's eye is detected for the finder optical system 112 (YES in step 6C), the process proceeds to step 7C. When the user's eye is not detected for the finder optical system 112 (No in step 6C), the process proceeds to step 10C.

In step 7C, the EVF display is turned on and the external display is turned off. In step 8C, a record image and an EVF image are generated and stored in the image buffer memory 120. In step 9C, the readout area of the image buffer memory 120 is shifted from using shake detection data and read, so that a reversely corrected image (an image equivalent to a captured image when the shake correction processing is not performed) is displayed as the EVF display. Thereby, a high-quality finder image in which the OVF display and the EVF display are correctly superimposed can be obtained.

In step 10C, the EVF display is turned off and the external display is turned on. In step 11C, a record image and an EVF image are generated and stored in the image buffer memory 120. In step 12C, an image, which is the readout area of the image buffer memory 120 that has been read without being shifted, is displayed on the external display 107 as the external display image.

In step 13C, it is determined whether or not the shutter release button has been fully pressed. When the shutter release button has not been fully pressed (NO in step 13C), the process returns to step 5C. When the shutter release button has been fully pressed (YES in step 13C), the process proceeds to step 14C. In step 14C, the image, which is the readout area of the image buffer memory 120 that has been read without being shifted, is as a record image. The record image is performed image compression processing or the like and recorded in the image recording memory 109. In step 15C, the shutter 115 is driven to close. In step 16C, the optical shake correction processing (sensor-shift method) is ended. In step 17C, the imaging sensor 103 is driven to finish.

Figure 7:
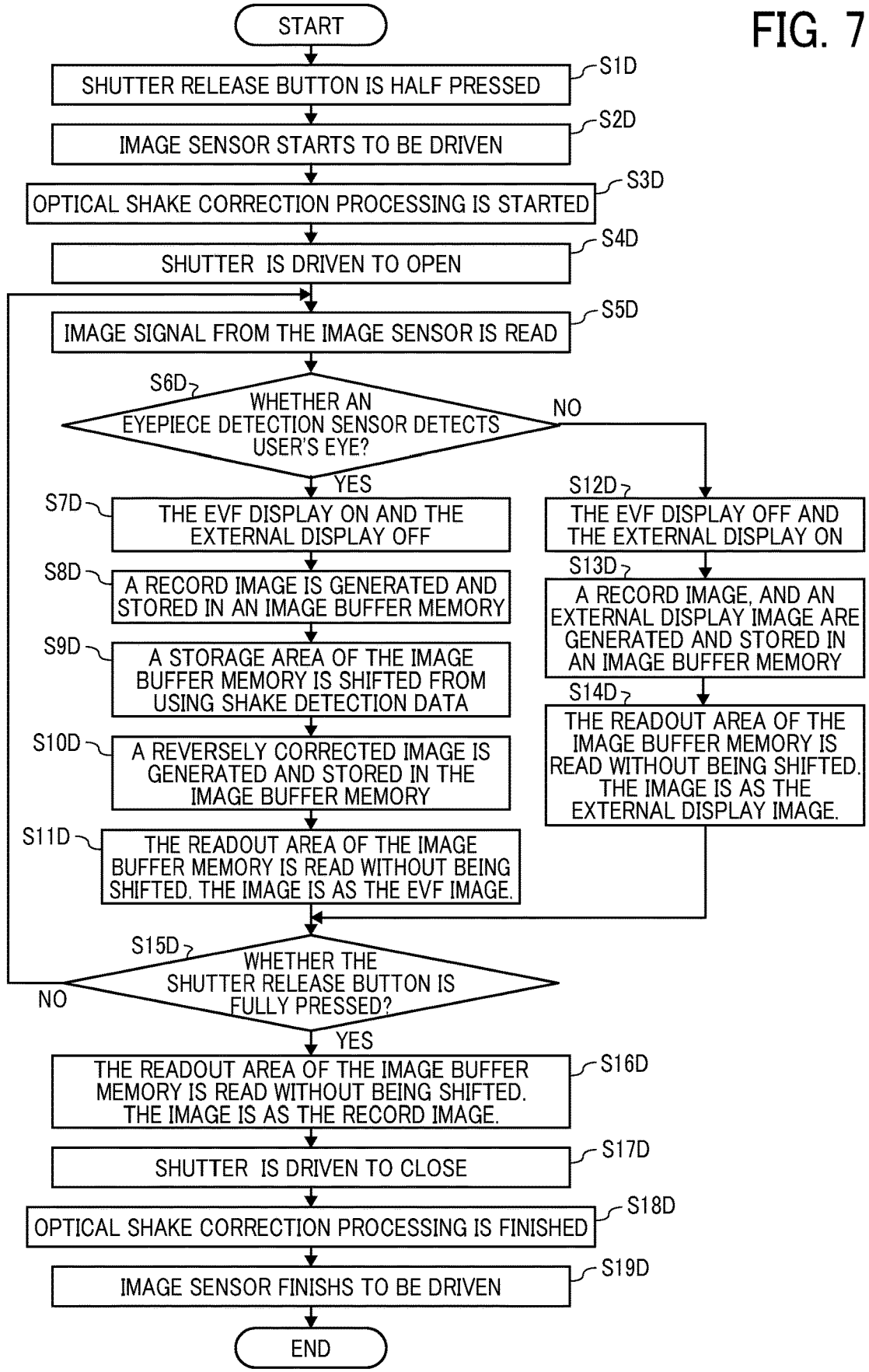
FIG. 7 is a flow chart of a fourth operation of an image capturing device according to the exemplary embodiment of the present disclosure.

FIG. 7 is a flowchart showing a fourth operation of the digital camera according to the present exemplary embodiment. The fourth operation corresponds to some conditions, which are optical shake correction processing (sensor-shift method), shake reverse correction (when reading memory), recording shake correction image and displaying the external display performs at the time when recording memory, and eyepiece determination.

In step 1D, the shutter release button is half pressed. In step 2D, the imaging sensor 103 starts to be driven. In Step 3D, the optical shake correction processing (sensor-shift method) is started. In step 4D, the shutter 115 is driven to open. In step 5D, the image signal from the imaging sensor 103 is read.

In step 6D, the eyepiece detection sensor 121 detects whether the finder optical system 112 is being looked into by a user or not. When the user's eye is detected for the finder optical system 112 (YES in step 6D), the process proceeds to step 7D. When the user's eye is not detected for the finder optical system 112 (No in step 6D), the process proceeds to step 12D.

In step 7D, the EVF display is turned on and the external display is turned off. In step 8D, the record image is generated and stored in the image buffer memory 120. In step 9D, the storage area of the image buffer memory 120 is shifted from using shake detection data. In step 10D, the reversely corrected image (the image equivalent to the captured image when the shake correction processing is not performed) is generated and stored in the image buffer memory 120 (the storage area of the image buffer memory is shifted in step 9D). In step 11D, the reverse corrected image is read without shifting the storage area of the image buffer memory 120. The reverse corrected image is as an EVF image and displayed on the EVF display. Thereby, a high-quality finder image in which the OVF display and the EVF display are correctly superimposed can be obtained.

In step 12D, the EVF display is turned off and the external display is turned on. In step 13D, the record image and the EVF image are generated and stored in the image buffer memory 120. In step 14D, the image, which is the readout area of the image buffer memory 120 that has been read without being shifted, is displayed on the external display 107 as the external display image.

In step 15D, it is determined whether or not the shutter release button has been fully pressed. When the shutter release button has not been fully pressed (NO in step 15D), the process returns to step 5D. When the shutter release button has been fully pressed (YES in step 15D), the process proceeds to step 16D. In step 16D, the image, which is the readout area of the image buffer memory 120 that has been read without being shifted, is as the record image. The record image is performed image compression processing or the like and recorded in the image recording memory 109. In step 15C, the shutter 115 is driven to close. In step 18D, the optical shake correction processing (sensor-shift method) is ended. In step 19D, the imaging sensor 103 is driven to finish.

Figure 8:
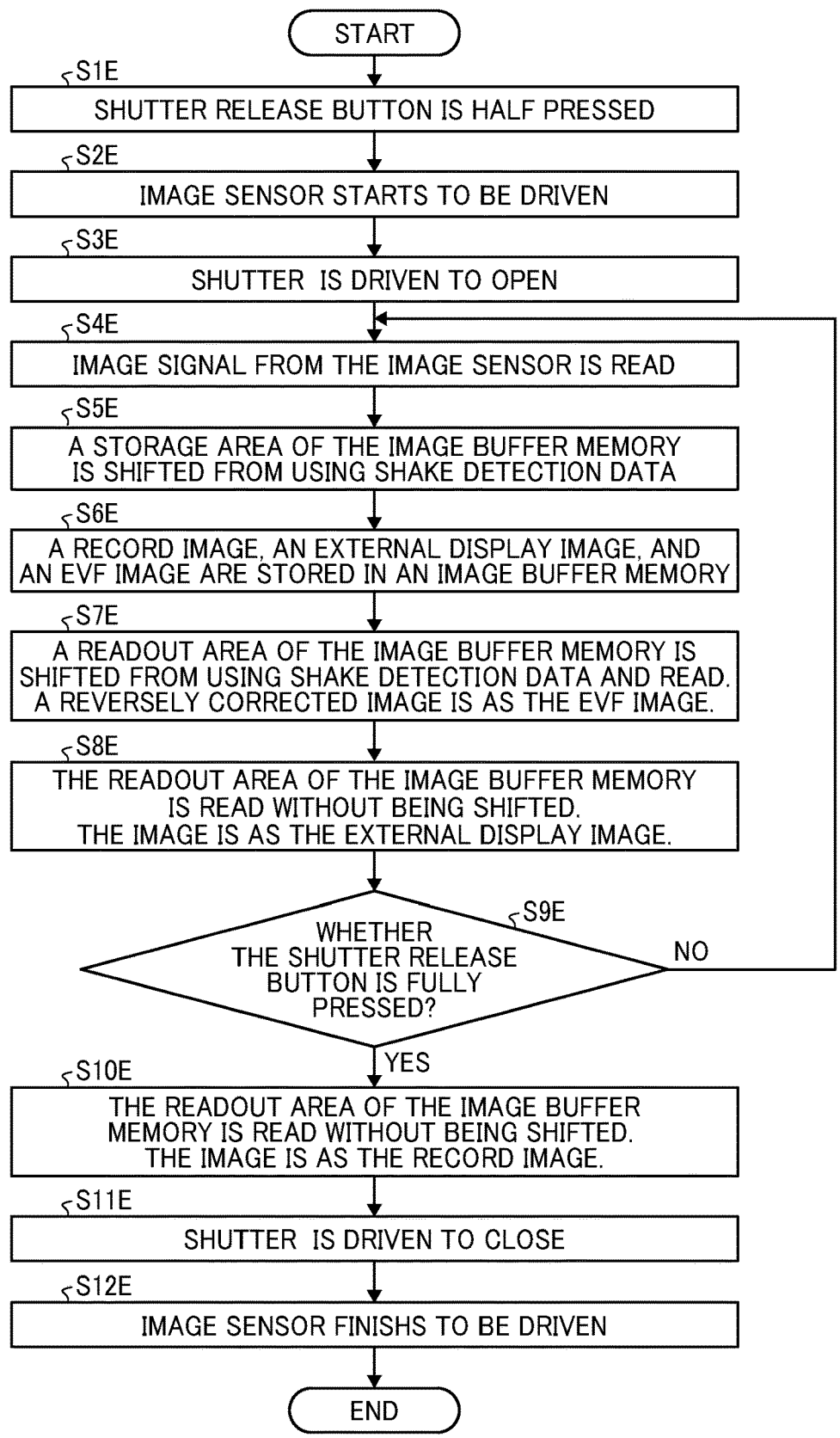
FIG. 8 is a flow chart of a fifth operation of an image capturing device according to the exemplary embodiment of the present disclosure.

FIG. 8 is a flowchart showing a fifth operation of the digital camera according to the present embodiment. The fifth operation corresponds to some conditions, which are electronic shake correction processing, shake reverse correction (when reading memory), recording shake correction image and displaying the external display performs at the time when recording memory, and no eyepiece determination.

In step 1E, the shutter release button is half pressed. In step 2E, the imaging sensor 103 starts to be driven. In step 3E, the shutter 115 is driven to open. In step 4E, the image signal from the imaging sensor 103 is read.

In step 5E, a storage area of the image buffer memory 120 is shifted from using the shake detection data. In step 6E, the record image, the external display image, and the EVF image are generated and stored in the image buffer memory 120. In step 7E, the readout area of the image buffer memory 120 is shifted from using shake detection data and read, so that a reversely corrected image (an image equivalent to a captured image when the shake correction processing is not performed) is displayed as the EVF display. Thereby, a high-quality finder image in which the OVF display and the EVF display are correctly superimposed can be obtained. In step 8E, the image, which is the readout area of the image buffer memory 120 that has been read without being shifted, is displayed on the external display 107 as the external display image.

In step 9E, it is determined whether or not the shutter release button has been fully pressed. When the shutter release button has not been fully pressed (NO in step 9E), the process returns to step 4E. When the shutter release button has been fully pressed (YES in step 9E), the process proceeds to step 10E. In step 10E, the image, which is the readout area of the image buffer memory 120 that has been read without being shifted, is as the record image. The record image is performed image compression processing or the like and recorded in the image recording memory 109. In step 11E, the shutter 115 is driven to close. In step 12E, the imaging sensor 103 is finished to drive.

Figure 9:
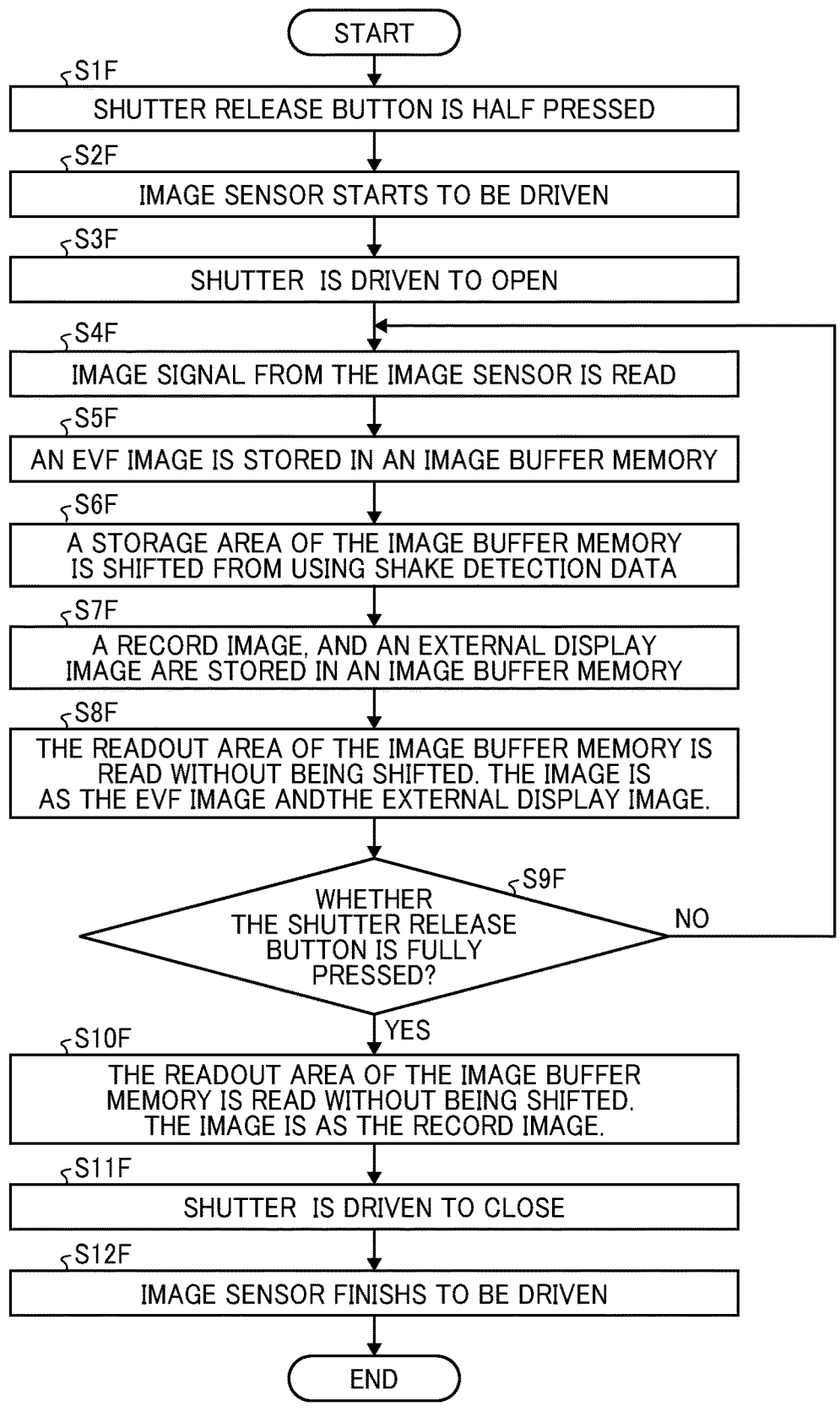
FIG. 9 is a flow chart of a sixth operation of an image capturing device according to the exemplary embodiment of the present disclosure.

FIG. 9 is a flowchart showing a sixth operation of the digital camera according to the present embodiment. The sixth operation corresponds to some conditions, which are electronic shake correction processing, no shake reverse correction, recording shake correction image and displaying the external display performs at the time when recording memory, and no eyepiece determination.

In step 1F, the shutter release button is half pressed. In step 2F, the imaging sensor 103 starts to be driven. In step 3F, the shutter 115 is driven to open. In step 4F, the image signal from the imaging sensor 103 is read.

In step 5G, the EVF image is generated and stored in the image buffer memory 120. The EVF image stored in the image buffer memory 120 is the captured image when the shake correction processing is not performed, that is, an image formed on the imaging sensor 103 itself.

In step 6F, the storage area of the image buffer memory 120 is shifted from using the shake detection data. In step 7F, the record image, and the external display image are generated and stored in the image buffer memory 120. In step 8F, the image, which is the readout area of the image buffer memory 120 that has been read without being shifted, is as the EVF image and the external display image. Thereby, a high-quality finder image in which the OVF display and the EVF display are correctly superimposed can be obtained.

In step 9F, it is determined whether or not the shutter release button has been fully pressed. When the shutter release button has not been fully pressed (NO in step 9F), the process returns to step 4F. When the shutter release button has been fully pressed (YES in step 9F), the process proceeds to step 10F. In step 10F, the image, which is the readout area of the image buffer memory 120 that has been read without being shifted, is as a record image. The record image is performed image compression processing or the like and recorded in an image recording memory 109. In step 11F, the shutter 115 is driven to close. In step 12F, the imaging sensor 103 is driven to finish.

Figure 10:
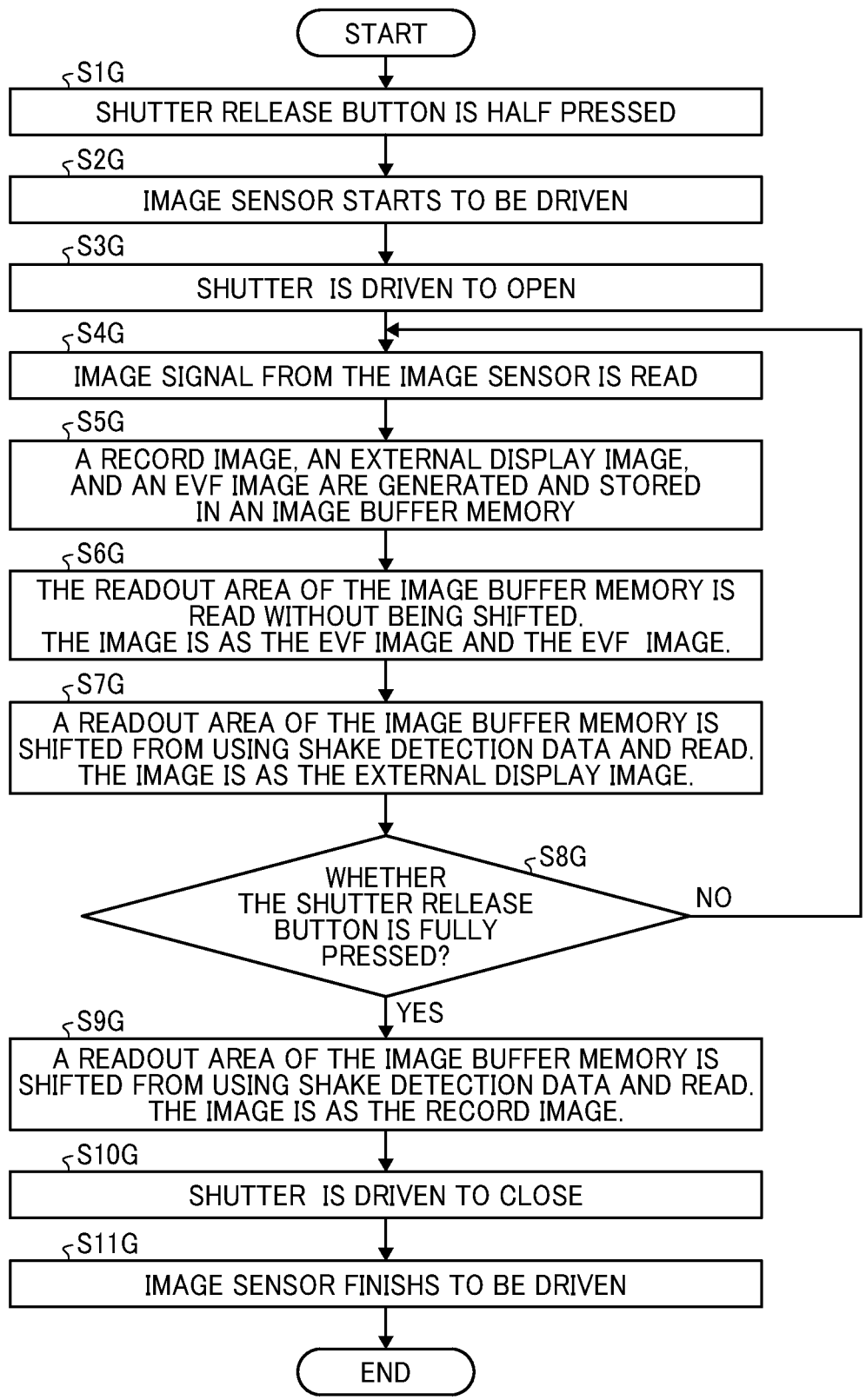
FIG. 10 is a flow chart of a seventh operation of an image capturing device according to the exemplary embodiment of the present disclosure.

FIG. 10 is a flowchart showing a seventh operation of the digital camera according to the present exemplary embodiment. The seventh operation corresponds to some conditions including electronic shake correction processing, no shake reverse correction, recording shake correction image and displaying the external display performs at the time when reading memory, and no eyepiece determination.

In step 1G, the shutter release button is half pressed. In step 2G, the imaging sensor 103 starts to be driven. In step 3G, the shutter 115 is driven to open. In step 4G, the image signal from the imaging sensor 103 is read.

In step 5G, the record image, the external display image, and the EVF image are generated and stored in the image buffer memory 120. In step 6G, the image, which is the readout area of the image buffer memory 120 that has been read without being shifted, is as EVF image. The image is equivalent to a captured image when the shake correction processing is not performed, or a formed image on the imaging sensor 103 itself. Thereby, a high-quality finder image in which the OVF display and the EVF display are correctly superimposed can be obtained.

In step 7G, the image, when the readout area of the image buffer memory 120 is shifted from using shake detection data and read, is as the external display image. In step 8G, it is determined whether or not the shutter release button has been fully pressed. When the shutter release button has not been fully pressed (NO in step 8G), the process returns to step 4G. When the shutter release button has been fully pressed (YES in step 8G), the process proceeds to step 9G. In step 9G, the image, which is the readout area of the image buffer memory 120 is shifted from using shake detection data and read, is as a record image. The record image is performed image compression processing or the like and recorded in the image recording memory 109. In step 10G, the shutter 115 is driven to close. In step 11G, the imaging sensor 103 is finished to drive.

Figure 11:
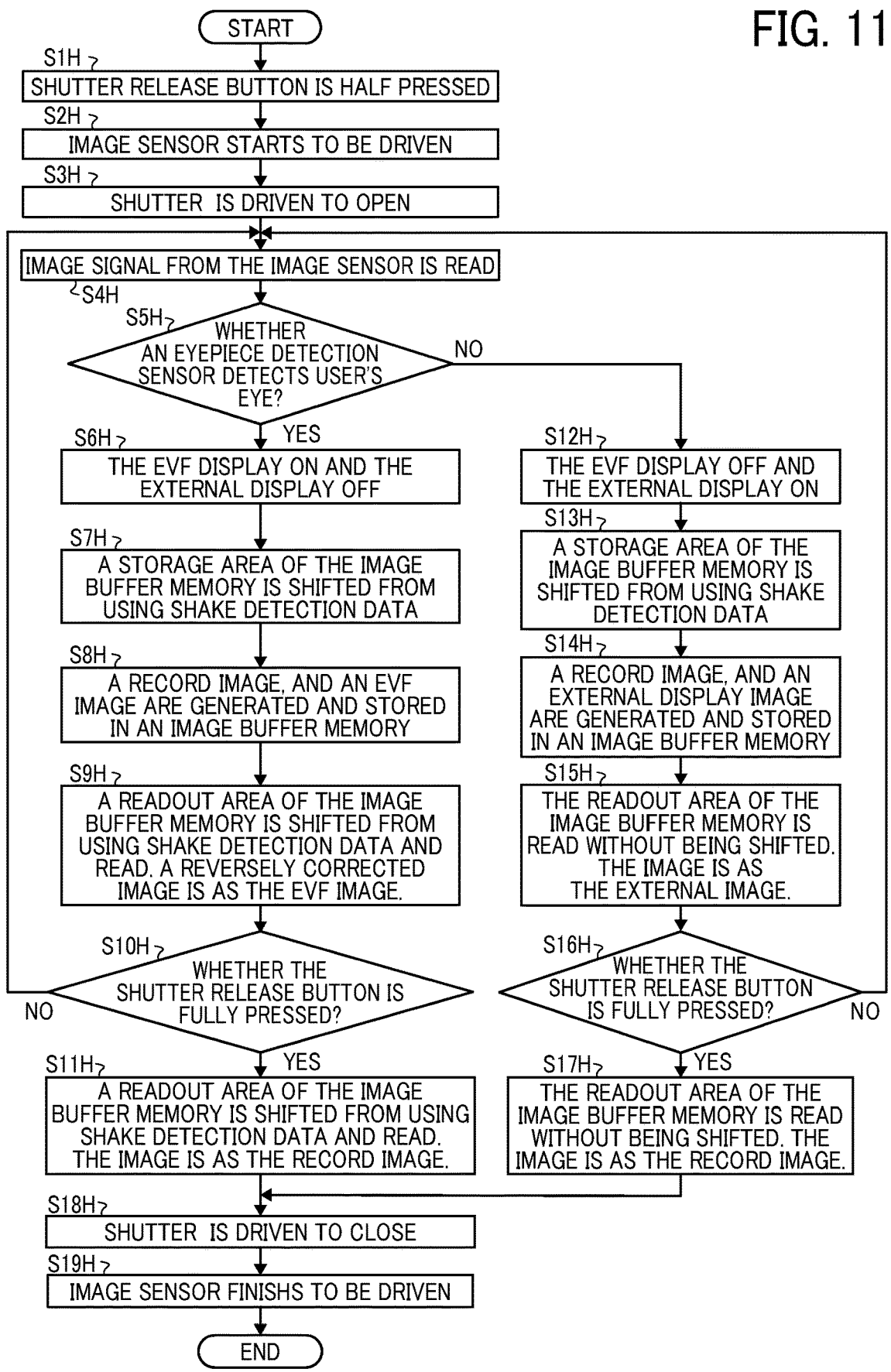
FIG. 11 is a flow chart of an eighth operation of an image capturing device according to the exemplary embodiment of the present disclosure.

FIG. 11 is a flowchart showing an eighth operation of the digital camera according to the present exemplary embodiment. The eighth operation corresponds to some conditions including electronic shake correction processing, shake reverse correction when reading memory, recording shake correction image and displaying the external display performs at the time when reading and recording memory, and eyepiece determination.

In step 1H, the shutter release button is half pressed. In step 2H, the imaging sensor 103 starts to be driven. In step 3H, the shutter 115 is driven to open. In step 4H, the image signal from the imaging sensor 103 is read.

In step 5H, the eyepiece detection sensor 121 detects whether the finder optical system 112 is being looked into by a user or not. When the user's eye is detected for the finder optical system 112 (YES in step 5H), the process proceeds to step 6H. When the user's eye is not detected for the finder optical system 112 (No in step 5H), the process proceeds to step 12H.

In step 6H, the EVF display is turned on and the external display is turned off. In step 7H, the storage area of the image buffer memory 120 is shifted from using shake detection data. In step 8H, the record image and the EVF image are generated and stored in the image buffer memory 120. In step 9H, the reversely corrected image is read, when the storage area of the image buffer memory 120 is shifted from using shake detection data. And the reversely corrected image (the image equivalent to the captured image when the shake correction processing is not performed) is as the EVF image and displayed on the EVF display. Thereby, a high-quality finder image in which the OVF display and the EVF display are correctly superimposed can be obtained. In step 10H, it is determined whether or not the shutter release button has been fully pressed. When the shutter release button has not been fully pressed (NO in step 10H), the process returns to step 4H. When the shutter release button has been fully pressed (YES in step 10H), the process proceeds to step 11H. In step 11H, the image, which is the readout area of the image buffer memory 120 is shifted from using shake detection data and read, is as the record image. The record image is performed image compression processing or the like and recorded in the image recording memory 109.

In step 12H, the EVF display is turned on and the external display is turned off. In step 13H, the storage area of the image buffer memory 120 is shifted from using the shake detection data. In step 7F, the record image, and the external display image are generated and stored in the image buffer memory 120. In step 15H, the image, which is the readout area of the image buffer memory 120 that has been read without being shifted, is as the external display image and displayed on the external display 107. In step 16H, it is determined whether or not the shutter release button has been fully pressed. When the shutter release button has not been fully pressed (NO in step 16H), the process returns to step 4H. When the shutter release button has been fully pressed (YES in step 16H), the process proceeds to step 17H. In step 17H, the image, which is the readout area of the image buffer memory 120 that has been read without being shifted, is as the record image. The record image is performed image compression processing or the like and recorded in an image recording memory 109.

In step 18H, the shutter 115 is driven to close. In step 19H, the imaging sensor 103 is finished to drive.

Figure 12:
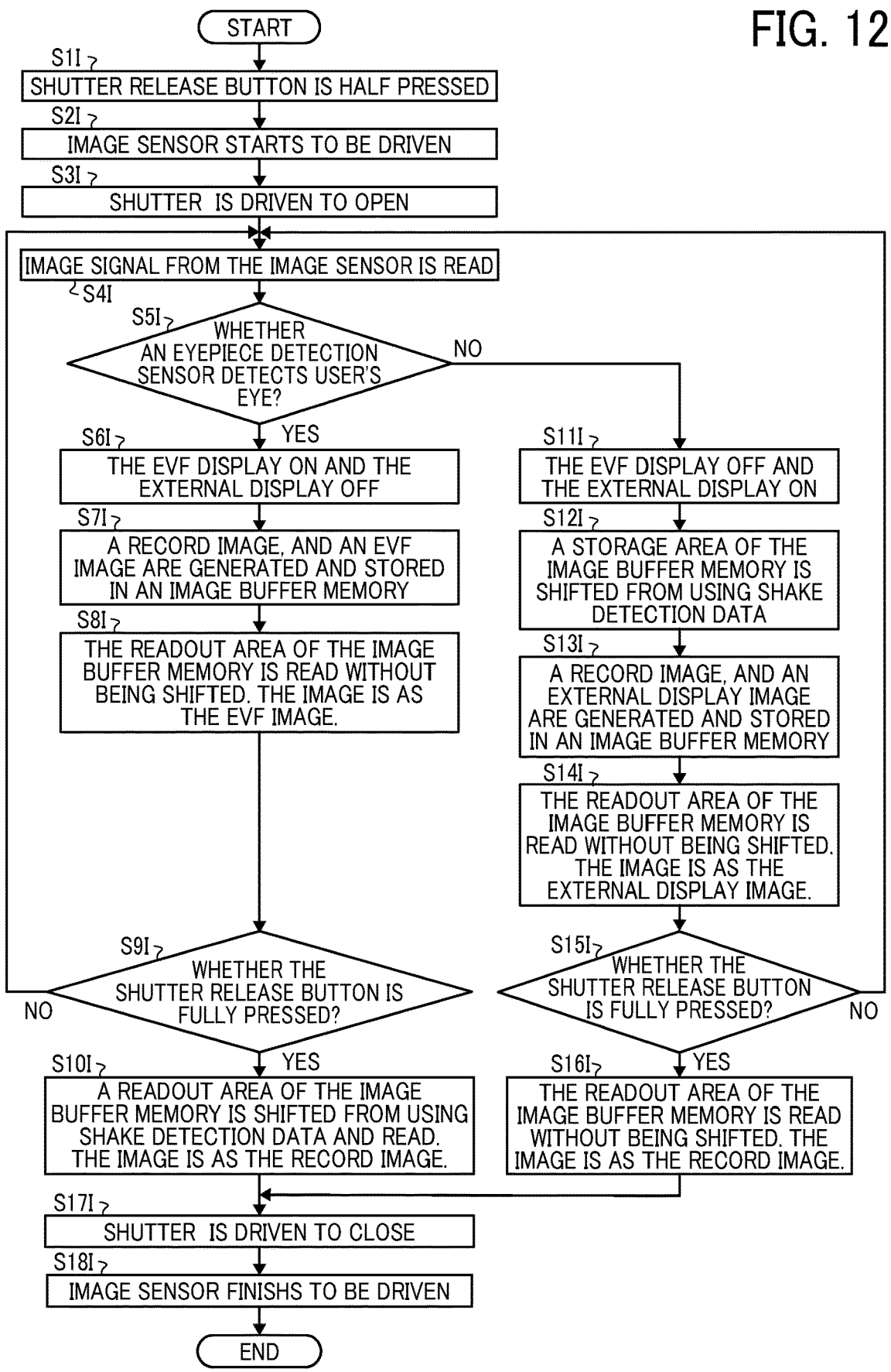
FIG. 12 is a flow chart of a ninth operation of an image capturing device according to the exemplary embodiment of the present disclosure.

FIG. 12 is a flowchart showing a ninth operation of the digital camera according to the present exemplary embodiment. The ninth operation corresponds to some conditions, which are electronic shake correction processing, no shake reverse correction, recording shake correction image and displaying the external display performs at the time when reading and recording memory, and eyepiece determination.

In step 1I, the shutter release button is half pressed. In step 2I, the imaging sensor 103 starts to be driven. In step 3I, the shutter 115 is driven to open. In step 4I, the image signal from the imaging sensor 103 is read.

In step 5I, the eyepiece detection sensor 121 detects whether the finder optical system 112 is being looked into by a user or not. When the user's eye is detected for the finder optical system 112 (YES in step 5I), the process proceeds to step 6I. When the user's eye is not detected for the finder optical system 112 (No in step 5I), the process proceeds to step 11I.

In step 6I, the EVF display is turned on and the external display is turned off. In step 7I, the record image, the external display image, and the EVF image are generated and stored in the image buffer memory 120. In step 8I, the image, which is the readout area of the image buffer memory 120 that has been read without being shifted, is as EVF image. The image is equivalent to the captured image when the shake correction processing is not performed, or the formed image on the imaging sensor 103 itself. Thereby, a high-quality finder image in which the OVF display and the EVF display are correctly superimposed can be obtained. In step 9I, it is determined whether or not the shutter release button has been fully pressed. When the shutter release button has not been fully pressed (NO in step 9I), the process returns to step 4I. When the shutter release button has been fully pressed (YES in step 9I), the process proceeds to step 10I. In step 10I, the image, which is the readout area of the image buffer memory 120 is shifted from using shake detection data and read, is as the record image. The record image is performed image compression processing or the like and recorded in the image recording memory 109.

In step 11I, the EVF display is turned off and the external display is turned on. In step 12I, the storage area of the image buffer memory 120 is shifted from using the shake detection data. In step 13I, the record image, and the external display image are generated and stored in the image buffer memory 120. In step 14I, the image, which is the readout area of the image buffer memory 120 that has been read without being shifted, is as the external display image and displayed on the external display 107. In step 15I, it is determined whether or not the shutter release button has been fully pressed. When the shutter release button has not been fully pressed (NO in step 15I), the process returns to step 4I. When the shutter release button has been fully pressed (YES in step 15I), the process proceeds to step 16I. In step 16I, the image, which is the readout area of the image buffer memory 120 that has been read without being shifted, is as the record image. The record image is performed image compression processing or the like and recorded in an image recording memory 109.

In step 17I, the shutter 115 is driven to close. In step 18I, the imaging sensor 103 is finished to drive.

Figure 13:
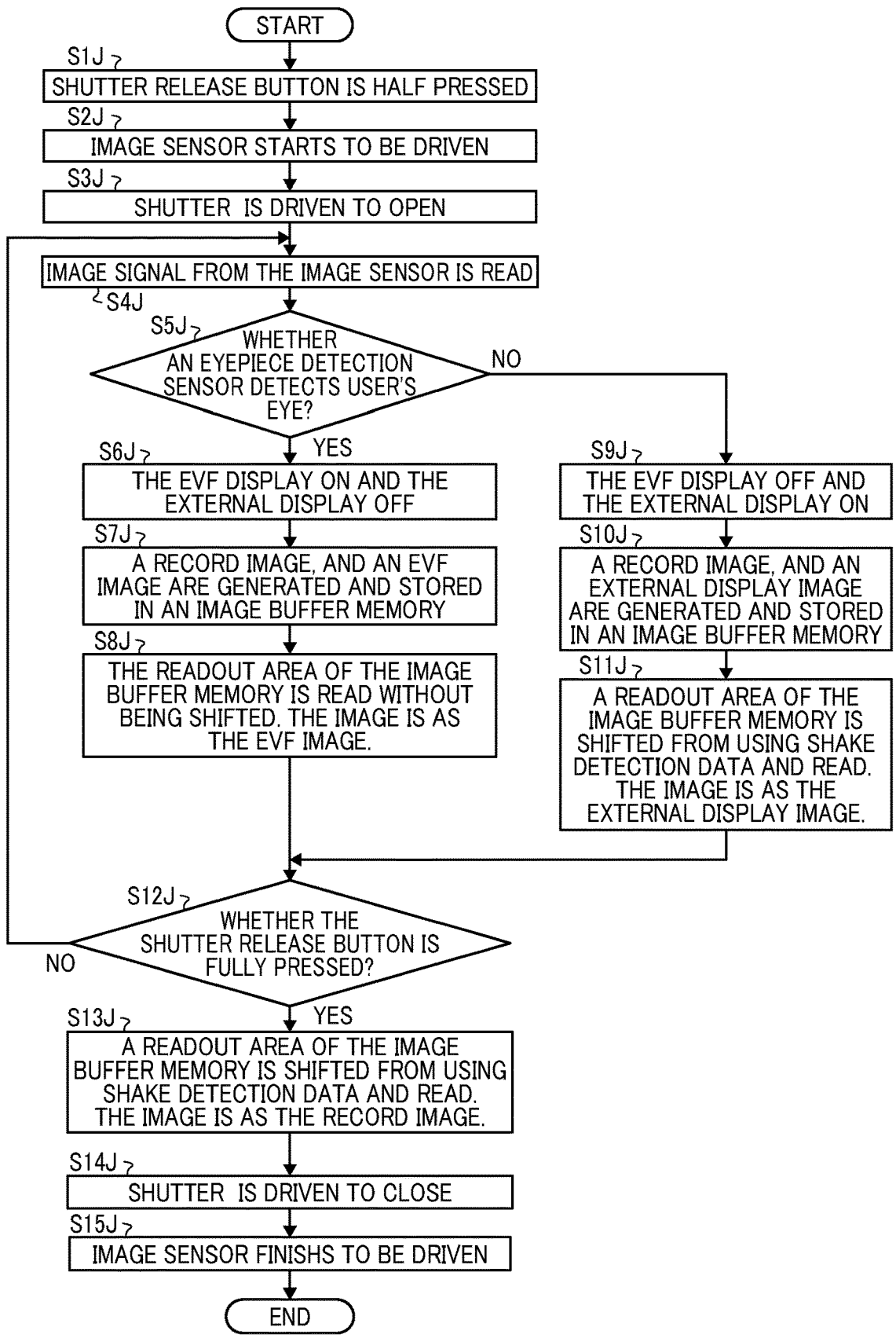
FIG. 13 is a flow chart of a tenth operation of an image capturing device according to the exemplary embodiment of the present disclosure.

FIG. 13 is a flowchart showing a tenth operation of the digital camera according to the present exemplary embodiment. The tenth operation corresponds to some conditions including electronic shake correction processing, no shake reverse correction, recording shake correction image and displaying the external display performs at the time when reading memory, and eyepiece determination.

In step 1J, the shutter release button is half pressed. In step 2J, the imaging sensor 103 starts to be driven. In step 3J, the shutter 115 is driven to open. In step 4J, the image signal from the imaging sensor 103 is read.

In step 5J, the eyepiece detection sensor 121 detects whether the finder optical system 112 is being looked into by a user or not. When the user's eye is detected for the finder optical system 112 (YES in step 5J), the process proceeds to step 6J. When the user's eye is not detected for the finder optical system 112 (No in step 5J), the process proceeds to step 9J.

In step 6J, the EVF display is turned on and the external display is turned off. In step 7J, the record image, and the EVF image are generated and stored in the image buffer memory 120. In step 8J, the image, which is the readout area of the image buffer memory 120 that has been read without being shifted, is as EVF image. The image is equivalent to the captured image when the shake correction processing is not performed, or the formed image on the imaging sensor 103 itself. Thereby, a high-quality finder image in which the OVF display and the EVF display are correctly superimposed can be obtained.

In step 9J, the EVF display is turned off and the external display is turned on. In step 10J, the record image, and the external display image are generated and stored in the image buffer memory 120. In step 11J, the image, which is the readout area of the image buffer memory 120 is shifted from using shake detection data and read, is as the external display image.

In step 12J, it is determined whether or not the shutter release button has been fully pressed. When the shutter release button has not been fully pressed (NO in step 12J), the process returns to step 4J. When the shutter release button has been fully pressed (YES in step 12J), the process proceeds to step 13J. In step 13J, the image, which is that the readout area of the image buffer memory 120 is shifted from using shake detection data and read, is as the record image. The record image is performed image compression processing or the like and recorded in the image recording memory 109. In step 14J, the shutter 115 is driven to close. In step 15J, drive of the imaging sensor 103 is finished.

Figure 14:
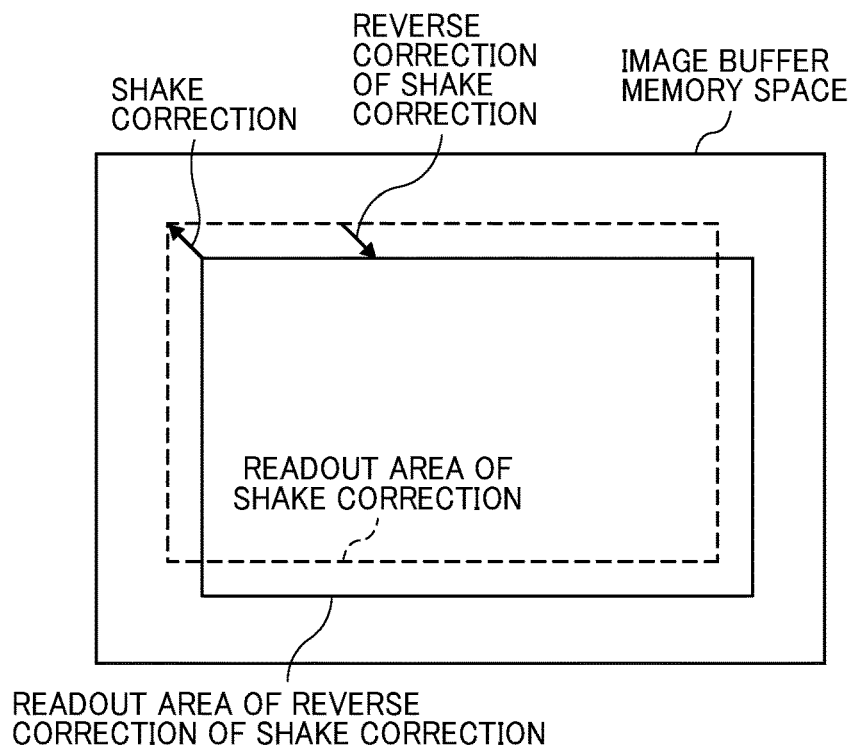
FIG. 14 is a conceptual diagram illustrating a first example of a reverse correction of a shake correction in an EVF image according to the exemplary embodiment of the present disclosure.

FIG. 14 is a conceptual diagram illustrating a first example of reverse correction of shake correction in the EVF image. In FIG. 14, it corresponds to some conditions including performing optical shake correction processing (sensor-shift method) and shake reverse correction when reading the memory. Images read from the imaging sensor and subjected to image processing are sequentially stored in a predetermined area (image buffer memory space) of the image buffer memory. When the shake correction is optical shake correction processing (sensor-shift method), the image read from the imaging sensor is shake corrected. Therefore, the memory reading area is shifted in the opposite direction to shake correction to reverse the shake correction.

Figure 15:
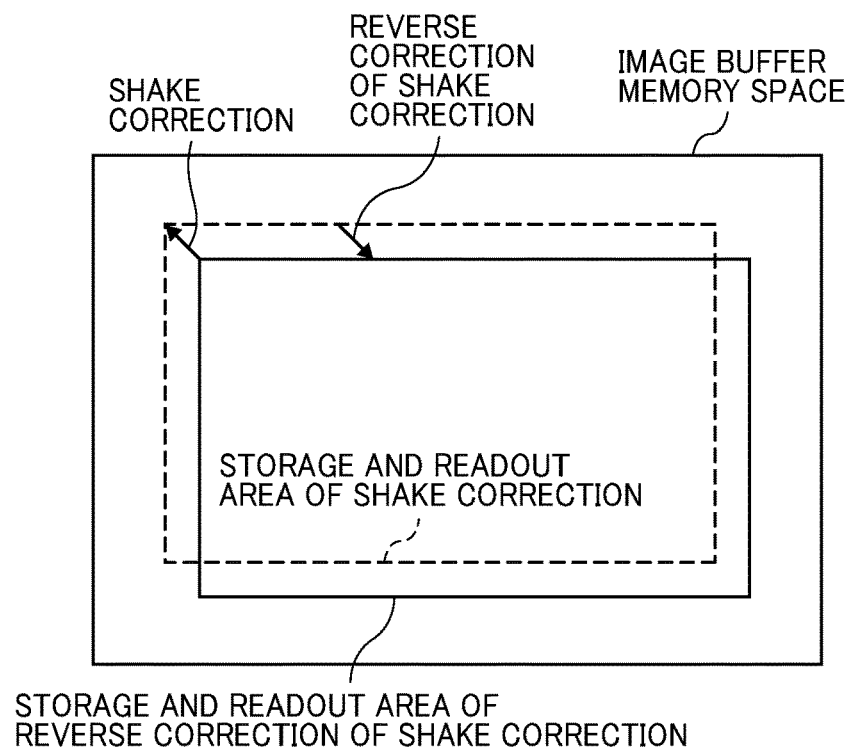
FIG. 15 is a conceptual diagram illustrating a second example of a reverse correction of a shake correction in an EVF image according to the exemplary embodiment of the present disclosure.

FIG. 15 is a conceptual diagram illustrating a second example of reverse correction of shake correction in the EVF image. FIG. 15 corresponds to some conditions including performing optical shake correction processing (sensor-shift method) and shake reverse correction when storing the memory. Images read from the imaging sensor and subjected to image processing are sequentially stored in a predetermined area (image buffer memory space) of the image buffer memory. When shake correction is the optical shake correction processing (sensor-shift method), the image read from the imaging sensor is shake corrected. Therefore, the memory storage area is shifted in the opposite direction to shake correction to reverse the shake correction. Reading from the memory is performed from the same area as the storage area.

Figure 16:
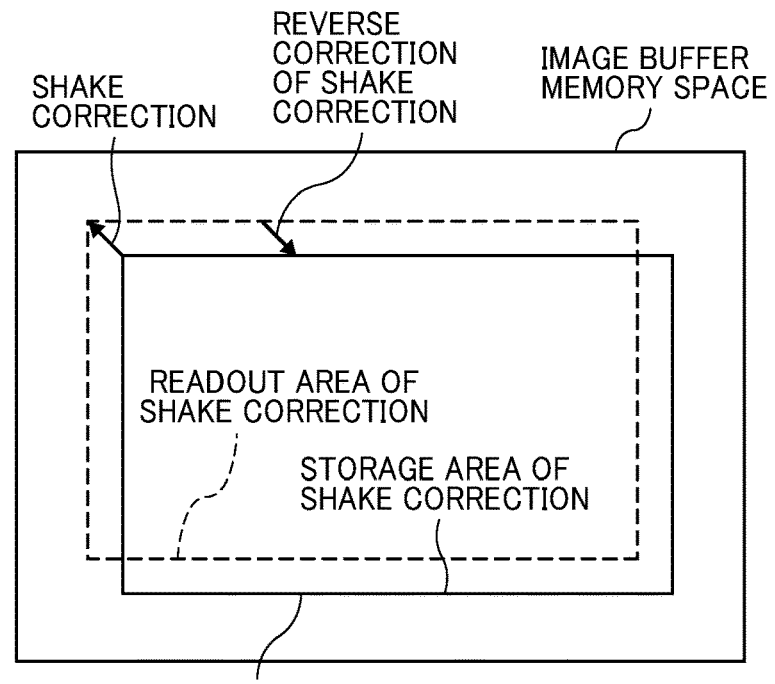
FIG. 16 is a conceptual diagram illustrating a third example of a reverse correction of a shake correction in an EVF image according to the exemplary embodiment of the present disclosure.

FIG. 16 is a conceptual diagram illustrating a third example of reverse correction of shake correction in the EVF image. FIG. 16 corresponds to some conditions including performing electronic shake correction processing and shake reverse correction when storing the memory. When the shake correction is the electronic shake correction processing, the image read from the imaging sensor is not subjected to the shake correction. Therefore, the shake correction is performed by storing the data in the memory and then reading the shifted read area. Therefore, the reverse correction processing of shake correction is achieved by setting the reading area as a storage area of the memory. In FIG. 16, the storage area and the reading area at the time of shake correction are shifted from each other, and the image area appears to be small. However, this figure is for easy understanding of the shift between the storage area and the reading area of the memory. The image data is stored in the memory so as to exist in an area that covers the reading area.

Figure 17:
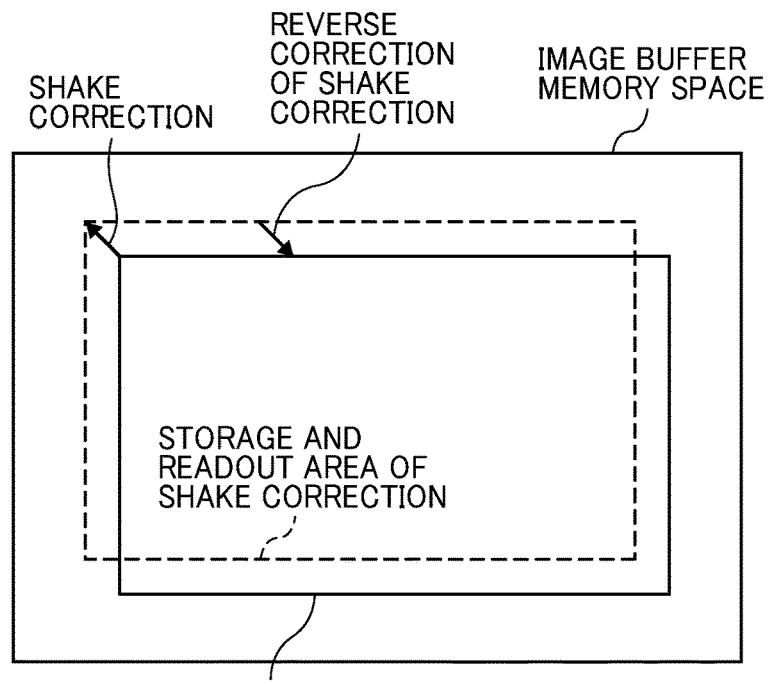
FIG. 17 is a conceptual diagram illustrating a fourth example of a reverse correction of a shake correction in an EVF image according to the exemplary embodiment of the present disclosure.

FIG. 17 is a conceptual diagram illustrating a fourth example of reverse correction of shake correction in the EVF image. FIG. 17 corresponds to some conditions including performing electronic shake correction processing, shake correction when storing the memory, and reverse correction of shake correction in the EVF image. When the shake correction is the electronic shake correction processing, the shake correction can be performed by shifting the storage area according to the shake correction data when the memory is stored. At this time, when a user is not looking into the viewfinder, the OVF image and the EVF image are not necessary to be superimposed. Therefore, it is not necessary to perform reverse correction of the shake correction of the EVF image. When a user is looking into the viewfinder, it can perform reverse correction of shake correction of the EVF image. In this case, only when a user is looking into the viewfinder, it can be shifted to the readout area for reverse correction of shake correction and read out.

In the above, certain descriptions were made of flowcharts including functional blocks, and steps. One of ordinary skill in the art will recognize that the particular order in which these functional blocks and steps were described is exemplary, and the functional blocks and steps may be performed in other orders, including reverse order, without departing from the scope of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. An imaging device, comprising:
    circuitry configured to
    set a shake correction mode that performs shake correction processing during shooting, and a superimposed display mode that performs superimposition and display of an image from an optical viewfinder display and an image from an electronic viewfinder display, the electronic viewfinder display being in an optical path of the optical viewfinder display,
    wherein when the shake correction mode and the superimposed display mode are set, the image from the electronic viewfinder display is one of a whole captured image for which the shake correction processing is not performed, or a whole image equivalent to the state without shake correction processing.

2. The image capturing device according to claim 1, wherein
    the circuitry is further configured to, in the shake correction processing, drive the imaging sensor in a direction different from the optical axis while shooting, and
    the electronic viewfinder display displays the image equivalent to the state without shake correction processing, which is an image formed on the imaging sensor is performed reversely correction processing to an image before shake correction processing.

3. The image capturing device according to claim 1, wherein
    the circuitry is further configured to, the shake correction processing, perform image processing on an image formed on the imaging sensor, and
    the image from the electronic viewfinder display that the electronic viewfinder displays as the captured image is an image formed on the imaging sensor.

4. The image capturing device according to claim 1, wherein
    the image from the electronic viewfinder display includes various types of information obtained by performing various types of processing on the image formed on the imaging sensor.

5. The image capturing device according to claim 4, wherein
    the various types of information included in the image from the electronic viewfinder display include at least one of a brightness over area of the image, a brightness under area of the image, a brightness step of the image, a color difference step of the image, a focus region of the image, an infrared region of the image, and a polarization region of the image.

6. The image capturing device according to claim 1, further comprising
    an image buffer memory to record a record image and an external display image,
    the record image and the external display image are used as the image performed the shake correction processing, and not displayed on the electronic viewfinder display.

7. The image capturing device according to claim 6, further comprising:
    an eyepiece detection sensor to detect user's eyepiece with respect to finder optical system,
    wherein the shake correction processing to the external display image is performed before a release button is pressed.

8. The image capturing device according to claim 1, further comprising:
    an eyepiece detection sensor to detect a user's eyepiece with respect to finder optical system,
    wherein the shake correction processing is not performed until a release button is pressed and shake correction processing is performed when the release button is pressed.

9. The image capturing device according to claim 1, wherein the electronic viewfinder display is a transmissive organic EL display.

10. An imaging device, comprising:
    circuitry configured to
    set a shake correction mode that performs shake correction processing during shooting, and a superimposed display mode that performs superimposition and display of an optical viewfinder display and an electronic viewfinder display,
    wherein when the shake correction mode and the superimposed display mode are set, a captured image for which the shake correction processing is not performed, or an image equivalent to the state without shake correction processing, is used as the electronic viewfinder display
    wherein the image capturing device further comprises:
    a movable mirror including a half mirror; and
    the circuitry is further configured to
        set (1) a superimpose display mode that superimposes and displays an optical image of a finder optical system and an electronic image captured by an image sensor, and (2) a consecutive photographing mode, control the movable mirror to rotate between (1) a mirror-down position, in which the mirror is inserted in a photographing optical path, reflects light to a finder optical system, and transmits the light to an image sensor, and (2) a mirror-up position in which the mirror is retracted from the photographing optical path and the light passes through to the image sensor, and prohibit the movable mirror from rotating to the mirror-up position and maintain the mirror-down position, when the superimpose display mode are set.

11. An imaging capturing method, comprising:

setting a shake correction mode that performs shake correction processing during shooting, and a superimposed display mode that performs superimposition and display of an image from an optical viewfinder display and an image from an electronic viewfinder display, the electronic viewfinder display being in an optical path of the optical viewfinder display, wherein when the shake correction mode and the superimposed display mode are set, the image from the electronic viewfinder display is one of a whole captured image which the shake correction processing is not performed, or a whole image equivalent to the state without shake correction processing.

* * * * *